Figure 1:
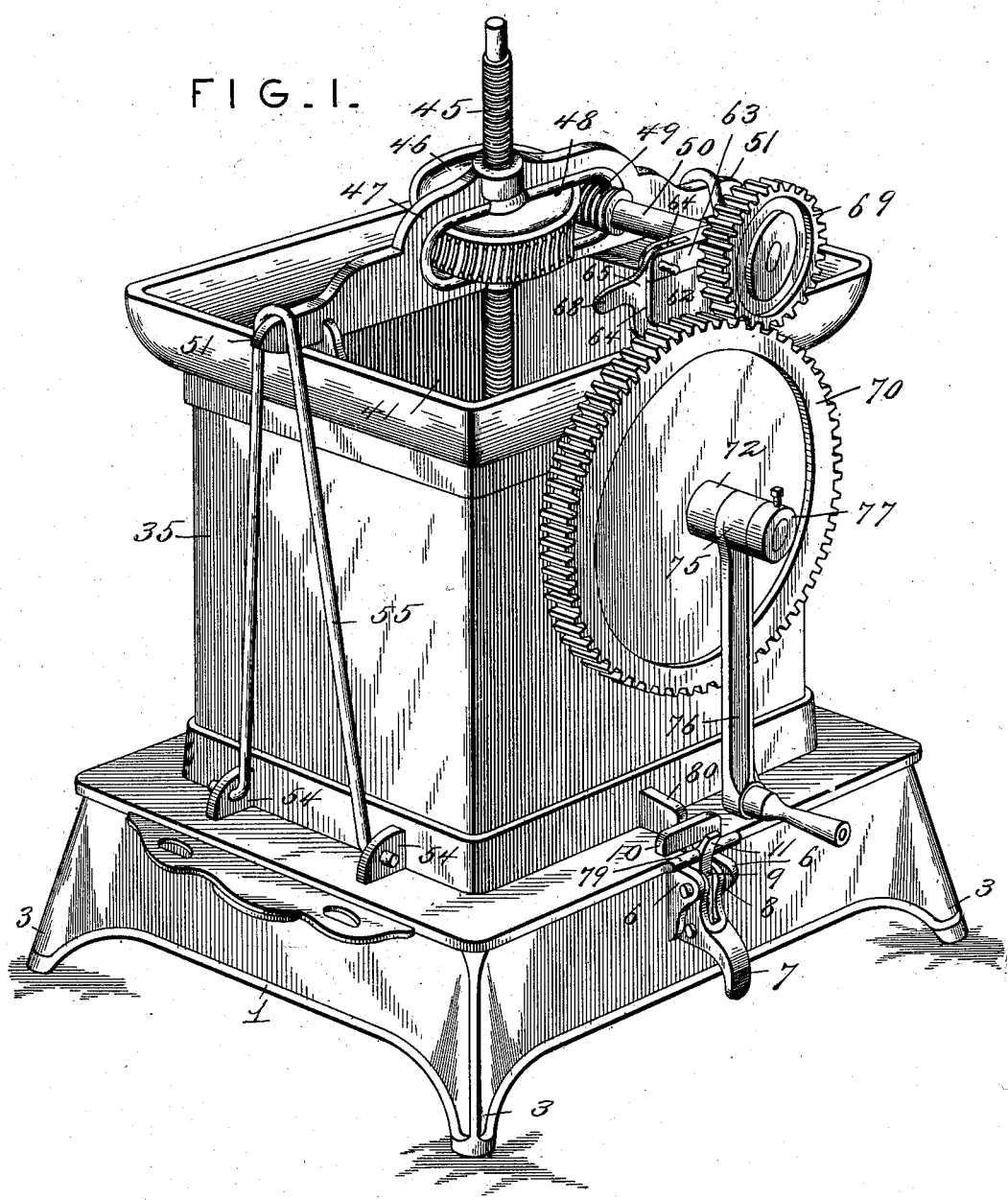

No. 757,301. PATENTED APR. 12, 1904.
W. N. HARING.
COMBINATION PRESS AND BUTTER MOLD.
APPLICATION FILED OCT. 17, 1903.
NO MODEL. 4 SHEETS—SHEET 1.

WITNESSES:
Harry L. Ames.
Chas. S. Hyer.

INVENTOR
William N. Haring
BY Victor J. Evans
Attorney

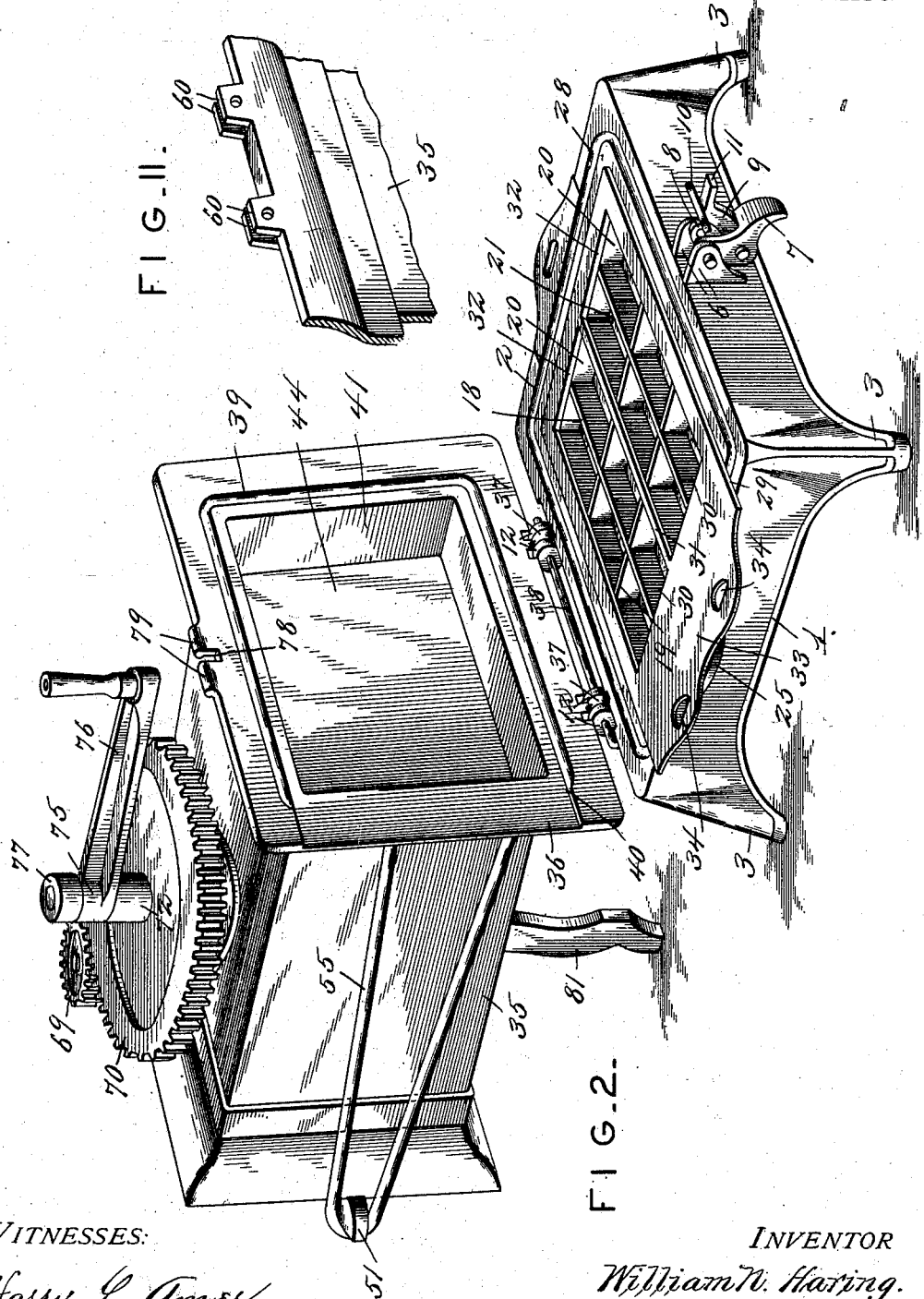

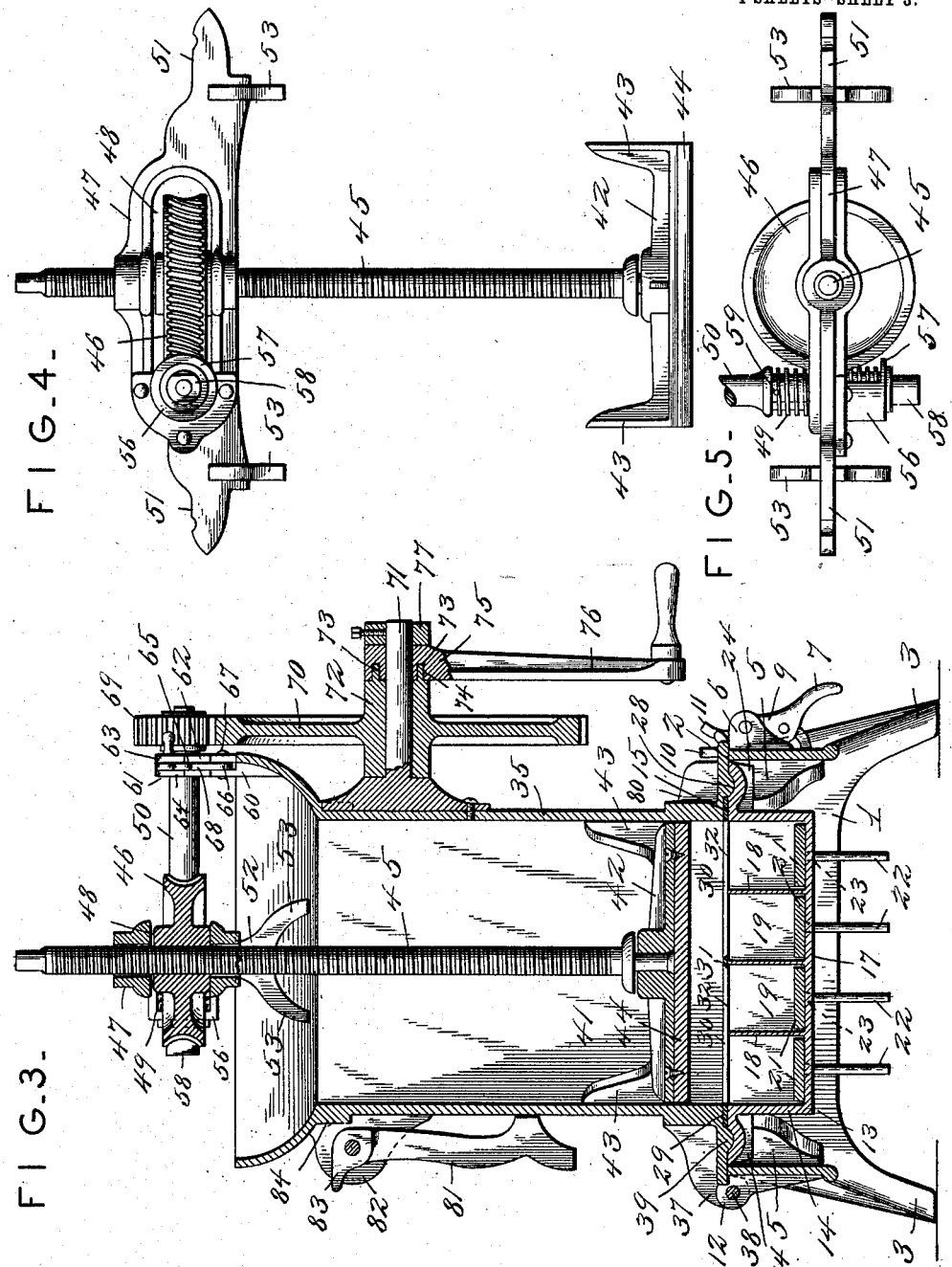

No. 757,301. PATENTED APR. 12, 1904.
W. N. HARING.
COMBINATION PRESS AND BUTTER MOLD.
APPLICATION FILED OCT. 17, 1903.
NO MODEL. 4 SHEETS—SHEET 4.
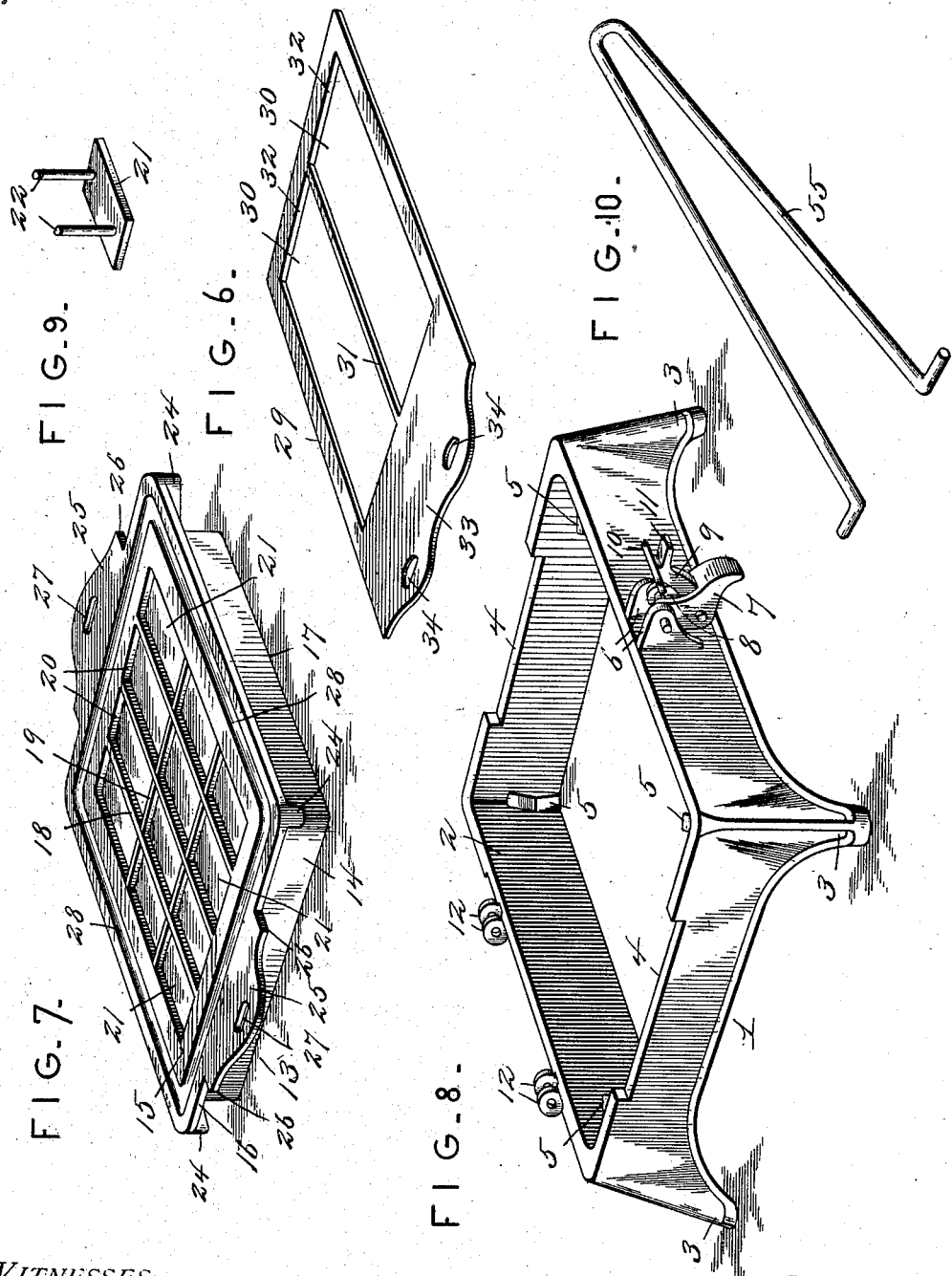
WITNESSES:
Harry L. Ames.
Chas. S. Hyer.
INVENTOR
William N. Haring.
BY Victor J. Evans
Attorney No. 757,301.

Patented April 12, 1904.

UNITED STATES PATENT OFFICE.

WILLIAM N. HARING, OF NYACK, NEW YORK.

COMBINATION PRESS AND BUTTER-MOLD.

SPECIFICATION forming part of Letters Patent No. 757,301, dated April 12, 1904.

Application filed October 17, 1903. Serial No. 177,486. (No model.)

*To all whom it may concern:*

Be it known that I, WILLIAM N. HARING, a citizen of the United States, residing at Nyack, in the county of Rockland and State of New York, have invented new and useful Improvements in Combination Presses and Butter-Molds, of which the following is a specification.

This invention relates to a combination press and butter-mold having means for forming a number of butter bricks or portions of other material equal in size and under certain conditions similar in weight. The mold has a base in which are located a series of molds of equal dimensions provided with extractor-plates for extracting the butter or other material from the molds and a receptacle or hopper movably attached to the base and having a plunger therein to force the butter down into the molds, the plunger being actuated by a simple feeding mechanism having a positive action to insure a regularity and equality of pressure on the mass of butter or other material disposed in the receptacle or hopper to effect a uniformity of concentration within the molds in the base, the latter being readily accessible after the molding operation by cutting the molded portion from the remaining portion in the hopper with the slide-cutter, then throwing the receptacle or hopper over to one side, and thus avoid complete separation of the salient parts of the structure to gain access to the mold proper. The device also has a base with molds therein of similar contour and dimensions with a sliding cutter withdrawably disposed thereover and of open construction to fully expose the molds and a receptacle or hopper to receive the mass of butter or other material that can be used and carrying pressure devices in connection therewith, the receptacle or hopper being movably attached to the base and forming a tight joint with the latter when closed. The mold is also provided with a molding-base and movable hopper or receptacle having pressing mechanism operating therein which is readily removable to clear the hopper for disposition below the main pressing element of the mass of butter or other material to be treated and also for conveniently reaching the interior of the receptacle or hopper for cleansing purposes. The several parts of the complete mold are all constructed and arranged to permit them to be conveniently assembled and disassociated, to render them strong and durable, and to produce a simplicity of structure without detracting from the necessary strength required in instituting a pressure sufficient to form bricks or portions of butter or other material having a uniform density. The mold also includes jointless structural features, particularly in the hopper or receptacle, which has the greatest strain imposed thereon by pressure devices, and is equipped with such attachments as to facilitate the operation of molding.

In the drawings, Figure 1 is a perspective view of a butter-mold embodying the features of the invention and shown in normal condition. Fig. 2 is a similar view of the mold shown open. Fig. 3 is a transverse vertical section through the mold. Fig. 4 is a side elevation of the plunger and removable supporting devices therefor, which are disposed in the hopper or receptacle of the mold. Fig. 5 is a top plan view of a portion of the pressure devices and operating parts, including a part of a worm-shaft to illustrate the bearing for the rear end thereof. Fig. 6 is a perspective view of the cutting-slide. Fig. 7 is a detail perspective view of the molding member of the base. Fig. 8 is a detail perspective view of the base, in which the molding member shown by Fig. 7 is removably mounted. Fig. 9 is a perspective view of one of the extracting-plates employed in the molds in the base and shown in inverted position. Fig. 10 is a detail perspective view of one of the resilient securing-yokes for holding the pressure devices in the hopper or receptacle. Fig. 11 is a detail perspective view of a portion of the upper edge of the hopper or receptacle, illustrating the construction for coöperating with separable devices in relation to the worm-shaft.

Similar numerals of reference designate corresponding parts in the several views.

The numeral 1 designates a base which is of substantially rectangular form, with an opening 2 therethrough having parallel side and end walls with their lower edges at an elevation above corner feet or supports 3. The end walls of the opening 2, also forming the ends of the base, have slots 4 in their upper edges, one in each and both of equal length, and in the corners of the opening 2 are diagonally-directed lugs or ledges 5, having their upper ends at a distance below the upper edge of the base.

At the center of the front side of the base are ears 6, between which is pivotally mounted the upper end of an operating element or cam 7, formed with an upper slot 8, in which is pivotally mounted the shank 9 of a longitudinally-extending catch 10 in the form of an integral plate, the catch in advance of the plate also having a projecting finger-piece 11 for convenience in throwing the catch outwardly in the element or cam 7. In the upper edge of the opposite or rear side of the base are intermediate pairs of apertured knuckles 12 to form a hinge connection for a part of the mold, which will be hereinafter described. The base constructed as set forth receives a removable mold member 13, formed with a rectangular body 14 and a top 15, with a flange 16 overhanging the sides and ends of the said body. The body 14 has a practically-closed bottom 17, with which a series of intersecting longitudinal and transverse partitions 18 and 19 connect to provide a plurality of rectangular molds 20, the upper edges of the partitions 18 and 19 being flush with the upper surface of the top 15. In the molds 20 are extracting-plates 21, having depending guide-stems 22, loosely movable through openings 23 in the bottom 17, a pair of these stems being used in connection with each extracting-plate to render the movement of the latter regular when clearing or forcing the brick or portion of material upwardly and out from each mold.

It will be understood that each mold has a single extracting-plate therein, and the stems 22 are necessarily extended from the under side of the mold to force the contents of the latter upwardly. At the corners the flange 16 has depending ribs 24, which are horizontally disposed and diagonally directed, the said ribs being adapted to engage the upper ends of the lugs or ledges 5 in the corners of the opening 2 of the base 1, the dimensions of the body 14 being such as to readily fit within the opening 2 of the base 1. At the opposite ends of the mold proper the flanges 16 are continued into grips 25, which project outwardly in horizontal planes and are provided with terminal shoulders 26 to fit snugly against the end walls of the slots 4, the depth of the slots and the thickness of the grips being precisely the same, so that the upper surface of the top 15 of the body 14 will be flush with the upper edge of the base 1 when said body is inserted in the latter. The ribs 24 also have such vertical extent that when they are in engagement with the upper ends of the lugs or ledges 5 there will be no strain imposed upon the grips, and for convenience in lifting or firmly engaging the grips 25 finger-slots 27 are formed in the latter. At a suitable distance inwardly from the perimeter of the flange 16 the top 15 of the mold member is formed with a groove 28, extending completely around the said top to assist in providing a tight joint with the hopper or receptacle in which the butter is primarily disposed. Slidably mounted on the top 15 is a cutter for separating the molded material from that remaining in the hopper, as clearly shown in detail by Fig. 6, the said cutter having a maximum width just equal to the top 15, measured from the inner edges of the groove 28, and the length of the cutting-slide is such as to permit a portion thereof to project outwardly over one end of the mold member and base. The inner end of the cutting-slide has a width just equal to that portion of the top 15, on which it normally rests, between the end walls of the adjacent molds and the contiguous inner terminal edge of the end portion of the groove 28, and the sides of said cutter are also of the same width as the portions of the top 15 between the outer side walls of the outer molds and the contiguous inner edges of the groove 28. These proportions are essential in order to completely clear the inlets to the molds 20, and to obtain this result the cutting-slide is constructed with two elongated rectangular openings 30, divided by a central web 31 of the same width as the central longitudinal partition 18. The openings 30 are of such length as to clear the outer end walls of the molds 20 nearest the opposite ends of the mold member, and the inner walls of said openings are formed with cutting edges 32 by inclining the same downwardly and outwardly, so as to bring the said cutting edges close to the surrounding surfaces of the inlets to the molds.

The outer extremity of the cutting-slide 29 is in the form of a broad flat wedge 33 with grip-openings 34 near the free end thereof, the length of the cutter being materially greater than that of the mold member over which it is disposed to project the outer end thereof for ready engagement by the operator. The central web 31 equalizes the drawing tension on the inner terminal of the cutting-slide to prevent bending or buckling of the same when performing the operation of cutting the molded butter from the inlets of the molds 20.

A hopper or receptacle 35 is employed in connection with the base and its parts just described and has a base-flange 36, formed with knuckles 37 at the rear edge which are inserted between the knuckles 12 of the base 1 and connected to provide a hinge-joint by a pintle or rod 38, inserted through all the knuckles. The base-flange 36 has dimensions about equal to those of the top of the base 1 and extending over the side portions, and one end thereof is a continuous rib 39, which fits in the groove 28 to produce a tight joint when the hopper or receptacle and base are disposed in normal condition. The rib 39 surrounds a recess 40 of such depth as to compensate for the thickness of the cutting-slide 29, said recess opening out through one end of the said base-flange 36 to permit the said cutting-slide to be withdrawn while the base and hopper or receptacle are held in connected relation. The hopper or receptacle is of rectangular form and incloses a feeding-chamber 41 of similar contour, and therein a plunger 42 is movably mounted and is steadied in its operation by corner-guides 43, which bear against the angles of the said chamber. The plunger 42 has a wood or analogous contacting plate 44 secured thereto, having direct engagement with the butter or other material to prevent sticking of the said material to the plunger and to render the operation of pressing the matter effective. The said plate 44 will be moistened or soaked in water before it is inserted in the chamber. The plunger 42 has a feed-screw 45 attached to the center thereof by a swivel connection and passes up through a horizontally-disposed worm-gear 46, held in a removable support or beam 47, the screw-rod being considerably longer than the vertical extent of the hopper or receptacle to permit a full downward movement of the plunger to the bottom of the hopper and avoid disengagement of the rod from the worm-gear. The screw-rod will have threads thereon of such pitch and dimensions as to insure a regular and comparatively fast feed. The support 47 consists of a vertically-disposed truss-beam with an opening 48 therethrough, in which the gear 46 is disposed, the said opening being long enough to also allow the projection therethrough of a worm 49, removably held on a shaft 50. The support 47 also has oppositely-projecting arms 51, which extend over the upper end edges of the hopper or receptacle 35, said upper edge of the hopper or receptacle being flared, as clearly shown by Fig. 3, and against the inner surface of the opposite ends thereof vertical legs 52 depend from the arms 51 of the bearing. The legs 52 are provided with feet 53, which diverge to establish a firm rest for the support 47 to prevent rocking of the latter. The ends of the hopper or receptacle 35, close to the flange 36, have pairs of upstanding lugs 54, in which the lower angular ends of resilient yokes 55 are pivotally mounted, the said yokes converging toward their opposite extremities, which are adapted to be thrown over the portions of the arms 51 projecting over the upper edge of the said hopper or receptacle to hold the support 47 firmly down in place. The yoke 55 may be readily detached from the terminal of the arms 51 when it is desired to withdraw the plunger 42 and screw-rod 45, together with the parts directly coöperating therewith, from the hopper or receptacle 35. The support 47 at one end of the opening 48 has a shell-bearing 56 projecting outwardly therefrom toward the rear, and the rear end of the shaft 50 is fitted in the end member 57 of said bearing and engaged by a cap-nut 58 to hold the same in place, the said nut being removable when it is desired to detach the shaft 50. The portion of the shaft 50 on which the worm 49 is mounted is reduced, and the said worm is removable from the pin 59, as clearly shown by Fig. 5, and the advantage of this construction is, that when the worm becomes worn it may be removed from the shaft and replaced by a new one.

The upper edge of the hopper or receptacle 35 at one side of the center is primarily formed with a vertical extension, which is cut through the center and longitudinally to provide pairs of attaching-ears 60, as clearly shown by Fig. 11. A shaft support and lock 61 is held by the ears 60 and comprises a lower rigid section 62 and an upper hinged section 63, both sections at one end being formed with slots 64 to receive a latch 65, pivoted at its upper extremity in the slot of the section 63 and having a lower depending latch-hook 66 to hook under a pin 67, held in the adjacent pair of ears, as shown by Fig. 3. The latch 65 has a finger-piece 68, by which it may be readily operated, and when the latch-hook 66 is forced under the pin 67 the section 63 will be held in firm engagement with the section 62. The shaft 50 extends through the sections 62 and 63 at their point of juncture or at their meeting edges, and when the section 63 is released and thrown over said shaft 50 may be withdrawn after the nut 58 on its rear end has been released. On the front end of shaft 50 a pinion 69 is secured and held in continual mesh with a spur-gear 70, movable over a portion of the front of the hopper or receptacle 35 and disposed in parallel relation to said front. The spur-gear 70 is held on an outwardly-projecting shaft 71, and to insure positive rotation of the gear the outer end of the hub 72 thereof has a pair of studs 73 projecting therefrom for entrance into corresponding sockets 74, formed in the rear side of the inner end 75 of a handle or operating-crank 76. The inner end 75 of the handle or operating-crank is also mounted over the shaft 71 and retained in place by a set-collar 77. By this means the operation of the gear 70 and the pinion 69 is positively effected when the handle or crank 76 is rotated and all tendency to loss of motion is avoided.

The center of the front portion of the flange 36 has a transverse slot 78 opening outwardly therefrom and guarded by catch projections 79, which are substantially circular in cross-section. The lower part of the center of the front side of the hopper or receptacle 35 directly in alinement with the slot 78 is formed with an outwardly-projecting stop-lug 80, and with the said slot 78, projections 79, and stop-lug 80 the catch on the base, heretofore described, coöperates. In locking the hopper or receptacle 35 and its flange 36 down on the base the catch-lever 7 is first elevated and the catch 10 is thrown over to cause its shank 9 to pass into the slot 78, when the lower edge of said catch will bear on the adjacent upper surface of the flange 36, close to the stop-lug 80. The catch-lever 7 is then forced downwardly, as shown by Fig. 1, and owing to the particular pivotal mounting of the shank of the catch-plate in the catch-lever and wherein the pivot on said shank is slightly in advance of that of the lever when the latter is down the said catch will be held in locked engagement with the flange 36. In releasing this catch the lever is elevated to loosen the parts and permit the catch to be drawn outwardly by grasping the finger-piece 11. This operation may be carried on with one hand, and the coöperating devices just set forth will form a very effective means for securing the several parts controlled thereby in immovable relation. At the center of the back of the hopper or receptacle 35 a prop-leg 81 is pivotally attached at its upper end between ears 82, and the function of this leg is clearly illustrated by Fig. 2, wherein it holds the hopper or receptacle at an elevation above the base-rest of the entire mold when said hopper or receptacle is open, the leg 81 assuming a vertical position and having an upper stop projection 83 to bear against a boss or projection 84 between the ears 82, to thereby prevent the leg from turning completely over and effecting the desired operation automatically.

In operation the base 1, with the parts adapted to be held thereby, is arranged as clearly shown by Fig. 2, and the hopper or receptacle 35 is drawn upwardly into erect position and secured over the base, said hopper or receptacle at such time having the plunger 42 and parts coöperating therewith removed therefrom. The butter or other material is then disposed in the hopper or receptacle and the plunger inserted in place thereover and the support 47, as well as the shaft 51, locked down respectively by the yokes 55 and the locking means 61. The operator then rotates the gear 70 through the medium of the handle or crank 76 to feed the plunger 42 downward against the butter. The butter as the plunger exerts pressure thereon is gradually forced into the molds 20, and the density of the bricks or portions molded by the pressure will be dependent on the extent of downward movement of the plunger in the hopper or receptacle. After the molds have become filled the operator grasps the projecting end of the cutting-slide and draws it outwardly. During this operation of the cutter the inner cutting edges 30 thereof closely bear against the upper edges of the projections 18 and 19 and scrape the butter off flush with said edges, at the same time separating the quantity of butter that may remain in the hopper or receptacle from that retained in the molds. The hopper or receptacle is then detached by releasing the catch 10 in the manner heretofore explained and thrown back to expose the molds. The bricks or portions of butter contained in the molds 20 are then removed from the base while in the molds and disposed on a flat surface with the free ends of the stems 22 engaging said surface. The weight imposed upon the stems will cause the same and the extracting-plates to be forced upwardly, when the butter or other material can be readily removed from the said extracting-plates, and the latter will then be free to assume their normal position by gravitation when the mold member is raised from the surface, or they may be otherwise placed in normal position, as by pressure exerted thereon. The hopper or receptacle is again locked in erect position, and a subsequent similar molding operation may be pursued. This operation will be carried on without withdrawing the plunger and coöperating parts from the hopper or receptacle as long as butter or other material remains in said hopper. As soon as the hopper becomes fully relieved of its charge of butter the plunger and its coöperating mechanism are withdrawn, the hopper or receptacle recharged, and the said plunger afterward arranged against the butter in normal position in the hopper. The operation of molding butter by the machine heretofore described can be expeditiously and reliably carried on, and when such operation is completed the parts of the machine may be readily cleaned and preserved in a wholesome or hygienic condition. It is obvious that the machine might be used at times for molding other material, and it is also possible to change the contour of the molds held in the base. By having the rib 39 fit in the groove 28 escape of the butter due to pressure thereon at the joint between the flange 36 and the top of the base will be obstructed. One mode of removing the butter from the molds has been described; but a more convenient method will consist in lifting the body 14, containing the molds, together with the extractors and butter therein, from the base and depositing the bricks on a suitable support or within a receptacle adapted for the purpose by reversing the said body and forcing the bricks out of the molds by depressing the followers. It is obvious that this will be a more expeditious mode of relieving the molds of the bricks, and after a clearance of said molds the body 14 will be again reset in the base.

From the general construction of the improved molding-machine as set forth it will be seen that economy in manufacture results, as well as strength and durability, and, further, all the parts are assembled in such manner that they may be readily disassociated without delay or the requirement of a skilled knowledge.

Changes in the proportions, dimensions, and minor details may be resorted to without in the least departing from the spirit of the invention.

Having thus described the invention, what is claimed as new is—

1. A combination mold and press of the class set forth, consisting of a molding-base adapted to remain in stationary position, a hopper hinged to the upper portion of one side of the base, pressure devices removably applied to and held within the hopper, and operating mechanism for said pressure devices carried by the hopper, the said pressure devices and operating mechanism being wholly supported by the hopper.

2. A combination mold, and press of the class set forth, consisting of a molding-base adapted to remain in stationary position, a hopper hinged to said base, pressure devices detachably secured to the hopper, the pressure devices and operating mechanism therefor being wholly carried by the hopper.

3. A combination mold and press of the class set forth, consisting of a molding-base having a molding device removably mounted therein and divided into regular forms, a receptacle hinged to one side of the base, pressure devices removably applied to and held within the receptacle, operating mechanism detachably secured to the receptacle, the pressure devices and operating mechanism therefor being wholly supported by the receptacle, and a dressing-slide disposed in close relation to the forms of the molding device.

4. In a molding device of the class set forth, the combination of a molding-base having a molding device removably mounted therein and divided into regular forms, clearing devices movably disposed in the forms, and a receptacle attached to one side of the base.

5. In a mold of the class set forth, the combination of a molding-base having a removable molding device therein divided into separate forms, a dressing-slide disposed in close relation to the upper portions of the forms, and a receptacle hinged to one side of the molding-base and having pressure mechanism coöperating therewith, the dressing-slide being fully exposable by turning the receptacle over one side of the base.

6. In a molding device of the class set forth, the combination of a molding-base of hollow form having supports on the inner portion thereof, a divided molding device removably mounted in the said base and adapted to engage said supports, and a receptacle hinged to one side of the base and having pressure devices operating in connection therewith.

7. In a mold of the class set forth, the combination of a molding-base, a molding device removably fitted within the base and having a groove in the upper surface thereof, a receptacle having a rib at its lower end to enter the said groove, and pressure devices in the receptacle.

8. In a mold of the class set forth, the combination of a molding-base, a molding device movably mounted in said base and divided into separate forms an open dressing-slide movable in close relation to the upper edges of the separate forms and having one terminal thereof which is normally held inclosed on the molding device formed with a rigid cutting edge, and a receptacle hinged to one side of the base and provided with pressure mechanism, the movement of the receptacle over the base fully exposing the dressing-slide and permitting the latter to be readily removed or applied.

9. In a molding device of the class set forth, the combination of a molding-base, a molding device removably mounted in said base, a dressing-slide loosely mounted on and freely removable from the upper portion of the molding device and normally having one end projecting outwardly from the base, and a receptacle hinged to one side of the base and movable over the upper part of the latter and the slide, the lower end of the receptacle being provided with a recess in its lower end to receive the dressing-slide and also having pressure devices coöperating therewith.

10. In a molding device of the class set forth, the combination of a molding-base having a molding device removably mounted therein and withdrawable from the upper portion thereof, a locking-catch at one side of the base, a hopper hinged to the side of the base opposite that carrying the catch and provided with a base-flange for engagement at one side by the catch, and pressure devices and operating mechanism therefor wholly mounted in and on the hopper and separable from the latter, the said pressure devices and operating mechanism being movable with the hopper over one side of the base to grip the latter.

11. In a mold of the class set forth, the combination of a base having recesses in the upper edges of the opposite ends, a molding device removably mounted in the said base and having grips at opposite ends to fit in the said recesses, the grips being normally projected outwardly beyond the opposite ends of the base, and a hopper hinged to one side of the base and having pressure devices coöperating therewith.

12. In a molding device, the combination of a molding-base having molding means therein, a hopper hinged to one side of the base and provided with pressure devices, and a support movably attached at one end to one side of the hopper.

13. In a molding device of the class set forth, the combination of a base having molding devices therein separated by intersecting partitions, a dressing-slide movable in close relation to the molding devices, the said slide being formed with two longitudinally-disposed openings separated by a central brace and also having the inner end walls of the openings reduced to form cutting edges, the central brace being disposed over the central partition of the molding devices, and a hopper hinged to one side of the base and having pressure devices coöperating therewith.

14. In a molding device of the class set forth, the combination of a base, a mold removably mounted therein and withdrawable through the upper portion thereof, the said mold being divided in separate forms by intersecting partitions, a dressing-slide loosely disposed over and freely removable from the upper edges of the said partitions, the dressing-slide having longitudinal openings separated by a central brace, and inner cutting edges and outer grip means, the brace being centrally located and normally disposed over the central partition of the forms, and a hopper hinged to one side of the base and having pressure devices coöperating therewith, the hopper being movable over the upper portion of the dressing-slide and base.

15. In a mold of the class set forth, the combination of a molding-base, a hopper movably attached to one side of the base, pressure mechanism coöperating with the hopper, and including a support engaging the upper part of the latter and resilient yokes for removably engaging opposite extremities of the support.

16. In a molding device of the class set forth, the combination of a molding-base, a hopper movably attached to one side of the base, a plunger movably disposed in the hopper and having a screw projecting upwardly therefrom, a worm-wheel engaging the screw, a removable shaft having a worm in mesh with the worm-wheel, a shaft-lock carried by the hopper to engage the shaft carrying the worm, a frame supporting the worm-wheel, means for removably engaging the frame, and gearing carried by the shaft and applied to the side of the hopper.

17. In a mold of the class set forth, the combination of a molding-base, a hopper hinged to one side of the base, a gear rotatably mounted on one side of the hopper, a plunger disposed in the hopper and having a feed-screw projecting upwardly therefrom, a frame removably held in the upper portion of the hopper and carrying a worm-wheel through which the said screw projects, a removable shaft having a worm in mesh with the worm-wheel, and a pinion engaging the said gear, and means carried by the hopper for securing the frame and the parts carried thereby in the hopper.

18. In a mold of the class set forth, the combination of a molding-base, a hopper movably attached to one side of the base, a plunger in the hopper having upper guides and a feed-screw projecting upwardly therefrom, a frame removably held in the upper portion of the hopper and carrying a worm-wheel through which the screw projects, a worm-shaft having a worm detachably mounted thereon to engage the worm-wheel, and a pinion, means for removably supporting the worm-shaft on the hopper, and a gear on the side of the hopper with which the pinion on the worm-shaft is adapted to mesh.

19. In a mold of the class set forth, the combination of a molding-base, a hopper movably attached to one side of said base, a removable pressure device in the hopper provided with feeding means, freely-removable actuating means on the upper portion of the hopper to operate said feeding means, devices for removably holding said actuating means on the hopper, and primary operating means on one side of the hopper with which a portion of said actuating means engages.

20. In a mold of the class set forth, the combination of a molding-base, a hopper movably attached to one side of said base, a frame removably held in the upper portion of the hopper and having a shell-bearing and projecting outwardly from one extremity, a worm-wheel held in the said frame, a plunger having a feed-screw projecting upwardly through the worm-wheel, a worm-shaft separately mounted on the upper portion of the hopper and in the shell-bearing and provided with a worm to engage the said worm-wheel, and gearing for operating the worm-shaft.

21. In a mold of the class set forth, the combination of a molding-base, a hopper movably attached to one side of said base and having a hinged shaft-lock at its upper portion, and pressure devices removably held in the hopper and including a worm-shaft removably engaged by the said lock.

22. In a molding device of the class set forth, the combination of a molding-base, a hopper movably disposed on said base, a frame removably applied to the upper part of the hopper and having oppositely-projecting extremities, resilient yokes movably attached to the hopper to engage the said extremities, a plunger and feeding means therefor held by the frame and a portion of the hopper, and gearing for actuating the said feeding means.

23. A mold of the class set forth consisting of a molding-base, a hopper movably attached to one side of the base and having an immovable stub-shaft projecting outwardly therefrom below the upper edge thereof, a pressure device in the hopper, a gear rotatably mounted on and freely removable from the said shaft and having projections on the outer end of the hub thereof, an operating-crank on the stub-shaft having recesses in the inner side of the portion thereof engaging the said shaft to receive the projections of the gear, and mechanism between the gear and the pressure device for actuating the latter.

24. In a molding device of the class set forth, the combination of a molding-base, a hopper movably attached to one side of the base, a frame applied to the upper part of the hopper and having depending legs near the opposite ends, the extremities of the frame projecting over the opposite ends of the hopper, yokes for removably engaging the frame extremities, a worm-shaft removably held on the hopper and in a portion of the said frame and carrying a pinion and a worm, a worm-wheel held in the frame to mesh with the worm on the said shaft, a plunger having a screw-stem extending upwardly through the worm-wheel, and primary operating means held on one side of the hopper and including a gear to mesh with the pinion on the said shaft.

In testimony whereof I affix my signature in presence of two witnesses.

WILLIAM N. HARING.

Witnesses:
ANDREW SAUTER,
JOHN C. KLEIN.